R. D. HAYWARD.
EGG CANDLER.
APPLICATION FILED MAY 24, 1911.

1,007,198.

Patented Oct. 31, 1911.

2 SHEETS—SHEET 1.

Witnesses

Inventor
Richard D. Hayward,

By

Attorney

R. D. HAYWARD.
EGG CANDLER.
APPLICATION FILED MAY 24, 1911.

1,007,198.

Patented Oct. 31, 1911.

2 SHEETS—SHEET 2.

Witnesses
John B. Tyrrell
L. M. Gillespie

Inventor
Richard D. Hayward.

By Alex. J. Wedderburn Jr.
Attorney

UNITED STATES PATENT OFFICE.

RICHARD D. HAYWARD, OF WARSAW, INDIANA.

EGG-CANDLER.

1,007,198. Specification of Letters Patent. Patented Oct. 31, 1911.

Application filed May 24, 1911. Serial No. 629,220.

*To all whom it may concern:*

Be it known that I, RICHARD D. HAYWARD, a citizen of the United States, residing at Warsaw, in the county of Kosciusko and State of Indiana, have invented certain new and useful Improvements in Egg-Candlers, of which the following is a specification.

This invention relates to improvements in egg testing devices and embraces the construction of an egg tester having reflector means for estimating the condition of the eggs to be tested.

One of the objects of the invention is the construction of a simple and inexpensive portable egg tester having means for supporting a number of eggs and means for illuminating the eggs and testing the same by a reflector located so as to receive the rays of the illuminating means.

With the above and other objects in view the invention embraces certain combinations, constructions and arrangements of parts, clearly described in the following specification and illustrated in the accompanying drawings, in which—

Figure 1:
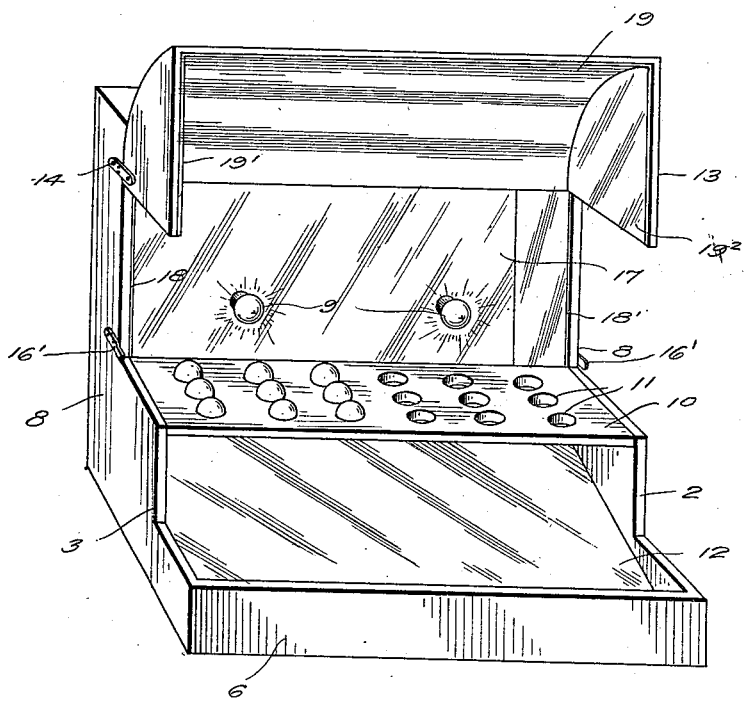
Figure 2:
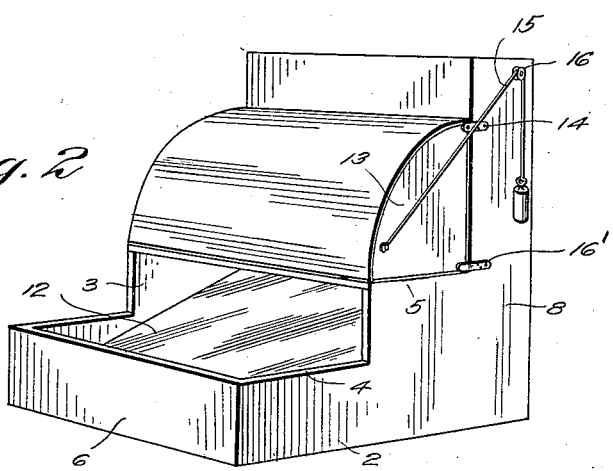
Figure 3:
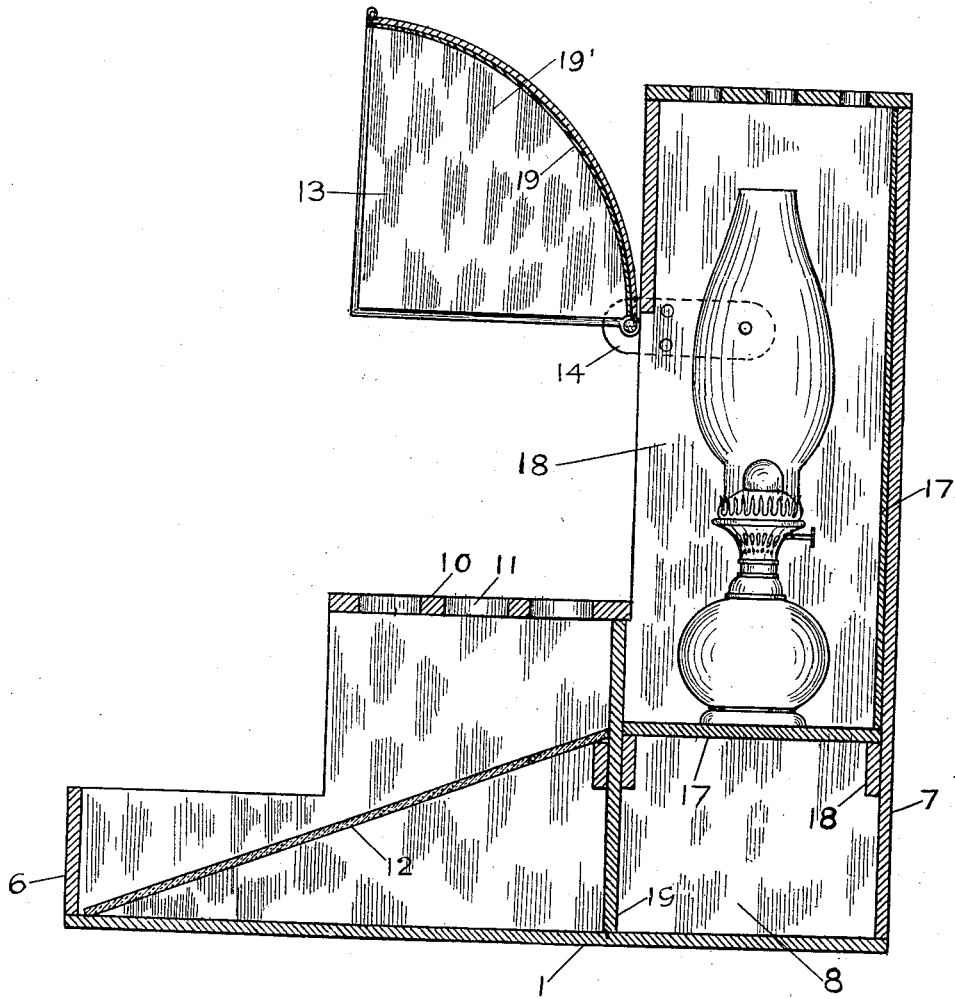

Figure 1 is a perspective view showing the hood of the device raised, Fig. 2 is a perspective view showing the hood of the device lowered, and Fig. 3 is a vertical longitudinal sectional view showing a modified form of lighting.

Referring to the accompanying drawings which are prepared for illustrative purposes and are accordingly not drawn to scale, numeral 1 denotes the base, upon which is mounted vertical side walls 2 and 3, each wall being formed with two steps 4 and 5. A front end wall 6 is located on the forward end of the base 1 and secured against the forward ends of the side walls 2 and 3, and a rear end wall 7 is located on the rear end of the base 1 and secured against the rear ends of the side walls. The rear portions of the side walls extend for a considerable distance above the forward and the intermediate portions thereof and are provided with a wall 8 forming a closure for the forward portions thereof. In the preferred form of the invention the inner walls are formed of or covered with mirror glass or other suitable reflecting material and is provided with electric lamps 9 or other suitable illuminating means.

Forwardly of the upstanding rear portions of the side walls an egg supporting tray 10 is secured to the inner sides of the walls 2 and 3, being formed with a series of egg receiving openings 11. At a plane beneath the egg tray 10 a mirror or reflector 12 is secured to the walls 2 and 3, being held at a slight incline thereon so as to reflect the shadows of the eggs forwardly of the device. When a number of eggs are placed in the openings of the tray 10 and the lamps 9 are energized the shadows of the eggs will be thrown upon the mirror or reflector 12 so that an experienced observer can readily estimate the freshness of the eggs reflected by means of the shadows, which will vary according to the state of freshness of the eggs.

In order to keep the tray 10 protected from dirt when the device is not employed and to aid an operator to more quickly test a number of eggs, a reflector hood 13 is hinged by means of links 14 to the upstanding rear portions of the sides 2 and 3, said hood being engaged by a weighted pulley rope 15, which passes over a pulley 16 fastened to the outer sides of wall 2. A latch 16' is located on the side wall 2 beneath the link 15 so as to engage the hood and hold the same in closed position. When the hood is closed as shown in Fig. 2 the light rays of the lamps 9 will be projected more strongly against the eggs and the shadows thereof will appear more distinctly on the reflecting mirror 12.

In Fig. 3 I have illustrated a modification of my invention comprising a device having a lamp of the ordinary house type and adapted to burn kerosene or other fuel which is located on a shelf 17 supported on blocks 18, fastened to the end wall 7 and to an intermediate partition 19, forming a support for the mirror 12. The operating of this modification is the same as the one previously described and it is especially designed for use in connection with places not having means for energizing electric lamps.

Having described my invention I desire to secure by Letters Patent:

An egg candler consisting of a lamp box having end and side walls, said side walls extending beyond said box and stepped, a perforated egg tray on one of said steps, an inclined mirror held between said extending side walls, a hinged cover adapted to close both said box and said egg tray, means for normally holding said cover in a raised position, and a catch to hold said cover down, the inner surface of said box and said cover lined with a reflecting surface.

In testimony whereof I affix my signature in presence of two witnesses.

RICHARD D. HAYWARD.

Witnesses:
ANDREW G. WOOD,
JOHN H. AIKEN.

Copies of this patent may be obtained for five cents each, by addressing the "Commissioner of Patents, Washington, D. C."